March 22, 1960 J. R. EWING 2,929,596
CLIP STRAP
Filed July 24, 1957

INVENTOR.
JAMES R. EWING
BY
*J. D. Douglas*

United States Patent Office 2,929,596
Patented Mar. 22, 1960

2,929,596

CLIP STRAP

James R. Ewing, Galesburg, Ill., assignor to Midwest Manufacturing Corporation, Galesburg, Ill.

Application July 24, 1957, Serial No. 673,973

4 Claims. (Cl. 248—74)

This invention relates to improvements in securing devices and more particularly to a securing device of the strap type useful for holding wires, tubes or the like in position on a structure.

Heretofore a great many of the strap type securing devices have been proposed. The majority of these devices are of a relatively complicated nature, expensive to make, difficult to install and have a limited range of adjustment.

By the present invention I have constructed a device which is extremely economical to manufacture, easy to install and which may readily be adjusted after the devices to be held are engaged to provide a more secure holding of the articles. One device may be used to secure a great many different sizes of articles.

Still other advantages of the invention and the invention itself will become apparent from the following description of an embodiment thereof which description is illustrated by the accompanying drawings.

Briefly, my invention contemplates a body adapted to receive a screw which may be secured to a support which may be a wall. A tongue extends from the body and is adapted to be wrapped around the device to be held and then extends between the body and the wall, the screw extending through holes in the tongue to clamp the entire assembly in position.

Figure 1:
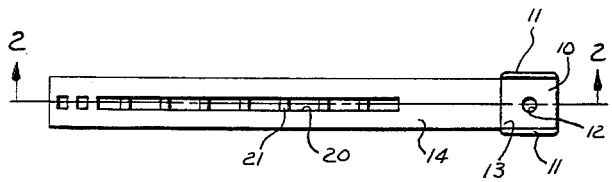
Fig. 1 is a plan view of a device of my invention.
Figure 3:
Fig. 3 is an end view.
Figure 2:
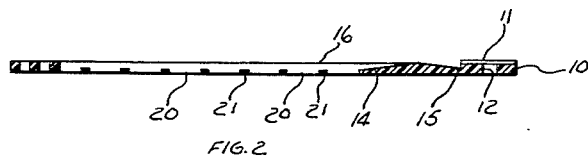
Fig. 2 is a vertical medial section.

More particularly, as shown in Fig. 1, the device includes a body 10 of generally square formation which may be provided with a pair of flanges 11 on either side of the body. It should be pointed out that the flanges 11 are desirable but not necessarily essential.

Centrally the body is provided with a hole 12 through which a screw may be passed, as later discussed. Extending from the body in alignment with the channel 13 defined by the flanges 11 is a tongue 14. Preferably the tongue is relatively thin at the point 15 where it engages the body and becomes thicker at 16. It may be of the same thickness throughout its length. Longitudinally of the body the tongue is provided with a plurality of slots 20 separated from each other by thin bridging portions 21. The slots extend along the longitudinal center line of the body and in longitudinal alignment with each other.

Figure 4:
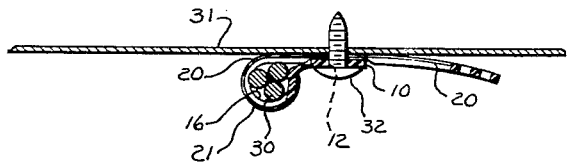
Fig. 4 is a view showing the devices secured to a wall and holding a plurality of wires.

In operation, it being assumed (Fig. 4) that the device is to be used for securing a plurality of wires 30 to a wall 31, the tongue is wrapped around the wires as illustrated and a screw 32 passed through the opening 12 and through one of the slots 20. It will be seen that because there is a plurality of slots that the bridging portions egage with the shank of the screw 32 and provide a temporary means for holding the assembly in position to the wall 31 with the free end of the tongue extending beyond the shank of the screw. The screw may be tightened and when so tightened presses the body 10 against the tongue 14, holding the same securely between the body and the wall 31.

The important feature of the invention is the fact that before the screw is tightened for finally securing the parts in place, the free end of the tongue 20 may be grasped by the fingers or a pair of pliers and pulled longitudinally to reduce the size of the bight which engages the wires. During this process the bridging members 21 that separate the slots from each other are ruptured and do not interfere with the pulling of the tongue to tighten the device. Once the bight is tightened satisfactorily, the screw may be tightened to firmly hold the same securely in place.

Having thus described my invention I am aware that numerous and extensive departures may be made therefrom without departing from the spirit or scope of the invention as defined by the appended claims.

I claim:

1. A device of the class described comprising a body portion having a central screw receiving opening for receiving a screw and spaced flanges on the edges to define a channel, a tongue extending from the body having a width coextensive to that of the channel, said tongue being formed with a plurality of longitudinally aligned and longitudinally extending apertures separated from each other by strips of thin rupturable material, said tongue being arranged to be bent around the object to be held, and into said channel with the screw extending through one of the openings and with the free end of the tongue projecting beyond the screw whereby it may be grasped and pulled to tighten the bent portion around the held object and said tongue arranged to be clamped by the screw between the body and the object to which the screw is secured.

2. A one-piece clip strap comprising a body having a screw-receiving opening therein, and an elongated tongue connected integrally to said body and extending lengthwise therefrom, said tongue having a longitudinal slot between its opposite sides, said tongue being flexible to form a loop and to extend from said loop back across said body, said tongue having a plurality of spaced thin bridging portions, each of which extends continuously transversely across said longitudinal slot from one side of the tongue to the opposite side, said bridging portions being spaced apart from each other lengthwise along the tongue and providing spaced openings along said longitudinal slot for selectively receiving the screw mounted at said screw-receiving opening in the body when the tongue is formed into a loop and extends back across said body, each of said bridging portions being readily rupturable when pulled past the screw as the tongue is pulled further back across said body to tighten said loop.

3. The clip strap of claim 1, wherein said body defines a channel through which said tongue extends back slidably.

4. A one-piece clip strap comprising a body having provision for receiving a fastener, and an elongated flexible tongue connected integrally to said body and extending lengthwise therefrom, said tongue being arranged to be bent into a loop around the object to be held and to extend from said loop back across said body, said tongue having a longitudinal slot therein between its opposite sides and having a breakable portion which extends transversely across said slot from one side of the tongue to the opposite side to provide a pair of openings at the slot at opposite sides of said bridging portion, said tongue when bent into a loop and extending back across said body selectively positioning one of said openings to initially receive the fastener at said body, and said bridging portion being readily breakable when pulled past said fastener as the tongue is pulled further back across said body to tighten said loop on the object to be held.

References Cited in the file of this patent

UNITED STATES PATENTS

| 809,993 | Sorg | Jan. 16, 1906 |
| 1,840,216 | Tormo | June 5, 1932 |
| 2,632,217 | Flora | Mar. 24, 1953 |

FOREIGN PATENTS

| 37,815 | France | Nov. 18, 1930 |

(Addition of Patent No. 651,110)